United States Patent
Ostermeier et al.

(10) Patent No.: US 11,503,765 B2
(45) Date of Patent: Nov. 22, 2022

(54) INDEPENDENT DOFFER DRIVE SYSTEM FOR A COTTON HARVESTER ROW UNIT

(71) Applicant: DEERE & COMPANY, Moline, IL (US)

(72) Inventors: Charles F. Ostermeier, Slater, IA (US); Joel M. Schreiner, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 573 days.

(21) Appl. No.: 16/190,619

(22) Filed: Nov. 14, 2018

(65) Prior Publication Data

US 2019/0075729 A1 Mar. 14, 2019

Related U.S. Application Data

(62) Division of application No. 15/277,035, filed on Sep. 27, 2016, now Pat. No. 10,172,287.

(51) Int. Cl.
| | |
|---|---|
| *A01D 46/08* | (2006.01) |
| *A01D 69/02* | (2006.01) |
| *A01D 46/18* | (2006.01) |
| *A01D 69/03* | (2006.01) |

(Continued)

(52) U.S. Cl.
CPC .......... *A01D 46/085* (2013.01); *A01D 46/08* (2013.01); *A01D 46/14* (2013.01); *A01D 46/18* (2013.01); *A01D 69/02* (2013.01); *A01D 69/03* (2013.01); *A01D 2101/00* (2013.01)

(58) Field of Classification Search
CPC ...... A01D 46/085; A01D 46/08; A01D 46/18; A01D 69/02; A01D 69/03
See application file for complete search history.

(56) References Cited

U.S. PATENT DOCUMENTS

| | | | | |
|---|---|---|---|---|
| 1,888,506 A | * | 11/1932 | Johnston | A01D 46/14 56/44 |
| 2,140,631 A | * | 12/1938 | Johnston | A01D 46/14 56/43 |
| 2,619,784 A | | 12/1952 | Paradise | |

(Continued)

FOREIGN PATENT DOCUMENTS

| | | |
|---|---|---|
| CN | 1175883 A | 3/1998 |
| CN | 2593538 Y | 12/2003 |

(Continued)

OTHER PUBLICATIONS

Chinese Office Action issued in Application No. 201710740647.1, dated Aug. 18, 2021; pp. 1-12.

*Primary Examiner* — Alicia Torres
(74) *Attorney, Agent, or Firm* — Taft Stettinius & Hollister LLP; Stephen F. Rost

(57) ABSTRACT

A doffer assembly for a cotton harvester having at least one drum and a spindle. The doffer assembly includes an outer housing and a plurality of doffers adapted to remove cotton from the spindle. The assembly further includes a drive unit coupled to the outer housing for rotatably driving the plurality of doffers independently of at least one drum and spindle. A drive shaft is rotatably driven by the drive unit, and an interface adapter is coupled between the drive shaft and the plurality of doffers. The drive unit may be an electric motor, hydraulic motor, a mechanical drive system, or a combination thereof.

12 Claims, 7 Drawing Sheets

(51) Int. Cl.
*A01D 46/14* (2006.01)
*A01D 101/00* (2006.01)

(56) References Cited

U.S. PATENT DOCUMENTS

| | | | | |
|---|---|---|---|---|
| 2,664,688 | A | * | 1/1954 | Louise .................. A01D 46/14 56/41 |
| 3,014,332 | A | * | 12/1961 | Hubbard ............... A01D 46/14 56/41 |
| 3,284,855 | A | * | 11/1966 | Steimen ................. D01B 1/04 19/48 R |
| 4,742,672 | A | * | 5/1988 | Orsborn ................ A01D 46/14 56/11.9 |
| 4,819,415 | A | * | 4/1989 | Engelstad ............. A01D 46/14 56/44 |
| 5,014,502 | A | * | 5/1991 | Richman ............... A01D 46/14 56/41 |
| 5,325,656 | A | | 7/1994 | Schreiner et al. |
| 6,415,589 | B1 | * | 7/2002 | Yribarren ............. A01D 46/14 56/50 |
| 7,386,380 | B2 | | 6/2008 | Bares et al. |
| 8,006,472 | B1 | | 8/2011 | Schreiner et al. |
| 8,074,433 | B2 | | 12/2011 | Sheidler et al. |
| 8,572,941 | B1 | | 11/2013 | Schreiner |
| 2002/0056262 | A1 | | 5/2002 | Favache |
| 2003/0019200 | A1 | | 1/2003 | Lemke |
| 2009/0233664 | A1 | | 9/2009 | Sheidler et al. |

FOREIGN PATENT DOCUMENTS

| | | |
|---|---|---|
| CN | 201204826 Y | 3/2009 |
| CN | 103109644 A | 5/2013 |
| CN | 103347725 A | 10/2013 |
| RU | 1782423 A1 | 12/1992 |
| SU | 444516 A | 9/1974 |
| SU | 1042654 A | 9/1983 |

* cited by examiner

INDEPENDENT DOFFER DRIVE SYSTEM FOR A COTTON HARVESTER ROW UNIT

RELATED APPLICATIONS

This application is a divisional application of U.S. patent application Ser. No. 15/277,035, filed Sep. 27, 2016, the disclosure of which is hereby incorporated by reference in its entirety.

FIELD OF THE DISCLOSURE

The present disclosure relates to a doffer drive system, and in particular to an independently controlled doffer drive system of a cotton harvester row unit.

BACKGROUND OF THE DISCLOSURE

Cotton harvester units include a number of spindles and doffers for harvesting cotton. Doffer columns have a plurality of doffers for removing picked cotton from the spindles. A doffer is a disc that may be coated in rubber or urethane and rotatably driven at a velocity much greater than that of the spindles. In a conventional cotton harvester row unit, the spindles move underneath the bottom face of the doffers so that the cotton is unwrapped and stripped from the spindles. In this conventional system, a doffer drive system is mechanically driven off a spindle drive system, or at the very least the two systems are mechanically coupled to one another. Mechanical coupling of the doffer and spindle drive systems enables the speed relationships to be maintained, and also achieves proper functionality when the systems operate in harvest mode. In other words, the spindles can operate in a desirable direction of travel.

There are, however, circumstances or applications in which independent control of the doffer may be desirable and which conventional systems are unable to achieve. In particular, it may be desirable to have independent control when a row unit plug is being cleared. When a row unit plugs, spindles often become wrapped with cotton which can jam or interfere with the desirable forward rotation of the picking unit components. Thus, a need exists to independently control the doffer drive system and spindle doffer system from one another so that when the spindles become plugged, the doffers can continuously be driven in the forward direction while the spindles are rotatably driven in a reverse direction. In doing so, the doffers could unwrap the cotton from the spindles without requiring any manual intervention.

SUMMARY

In one embodiment of the present disclosure, a doffer assembly for a cotton harvester having at least one drum and a spindle, including an outer housing; a plurality of doffers adapted to remove cotton from the spindle of the harvester; a drive unit coupled to the outer housing for rotatably driving the plurality of doffers independently of at least one drum and spindle; a drive shaft rotatably driven by the drive unit; and an interface adapter coupled between the drive shaft and the plurality of doffers.

In a first example of this embodiment, the doffer assembly may include a drive coupler coupled to the drive shaft; and a driven coupler coupled to the drive coupler and the interface adapter. In a second example, the drive unit includes an electric or hydraulic motor. In a third example, the drive unit is axially aligned with the plurality of doffers. In a fourth example, the doffer assembly may include a doffer adjustment device for axially adjusting the plurality of doffers relative to the doffer housing, the doffer adjustment device including a doffer adjustment shaft and a doffer adjustment ring gear.

In another embodiment of the present disclosure, a picker unit assembly of a cotton harvester, includes a drum and a plurality of spindles rotatably coupled to the drum; a drum and spindle drive unit for rotatably driving the drum and the plurality of spindles; a doffer assembly including a plurality of doffers configured to remove cotton from the plurality of spindles; and a doffer drive unit for rotatably driving the doffer assembly, wherein the doffer drive unit rotatably drives the doffer assembly independently of the plurality of spindles.

In one example of this embodiment, the doffer drive unit includes an electric motor. In a second example, the picker unit may include an inverter for providing electrical power to the motor for driving the doffer assembly, the inverter further adapted to detect a condition related to doffer wear or a plug based on feedback received from the motor. In a third example, the picker unit may include a second doffer assembly including a plurality of doffers configured to remove cotton from a second plurality of spindles, wherein the second doffer assembly is rotatably driven independently of the first and second plurality of spindles. In a fourth example, the doffer drive unit rotatably drives both the first and the second doffer drive assemblies.

In a further example, the picking unit may include a second doffer drive unit for rotatably driving the second doffer assembly; and an inverter for electrically powering the first and second doffer drive units. In yet a further example, the doffer drive unit comprises a hydraulic motor for hydraulically powering the plurality of doffers. In yet another example, the picking unit may include a second doffer assembly including a plurality of doffers configured to remove cotton from a second plurality of spindles, wherein the second doffer assembly is rotatably driven independently of the first and second plurality of spindles; and a second doffer drive unit for hydraulically powering the second doffer assembly.

In a further embodiment of the present disclosure, a cotton harvester includes a drive unit for producing mechanical power; a controller for controlling the cotton harvester; a plurality of picker units configured to harvest cotton, wherein each of the plurality of picker units includes a drum; a plurality of spindles rotatably coupled to the drum; a drum and spindle drive for rotatably driving the drum and the plurality of spindles; a doffer assembly including a plurality of doffers configured to remove cotton from the plurality of spindles; and a doffer drive unit for rotatably driving the doffer assembly, wherein the doffer drive unit rotatably drives the doffer assembly independently of the drum and spindle drive.

In one example of this embodiment, the doffer drive unit includes an electric motor or hydraulic motor. In a second example, the plurality of picking units includes a first picking unit and a second picking unit, the first picking unit and the second picking unit each including a doffer drive unit and a doffer assembly, the doffer drive unit including a front doffer drive unit and a rear doffer drive unit, and the doffer assembly including a front doffer assembly and a rear doffer assembly; further wherein, the front doffer drive unit of the first and second picking units operably drives the respective front doffer assembly, and the rear doffer drive unit of the first and second picking units operably drives the respective rear doffer assembly.

In a third example, the cotton harvester may include a first inverter for electrically controlling the front doffer drive unit and rear doffer drive unit of the first picking unit; and a second inverter for electrically controlling the front doffer drive unit and rear doffer drive unit of the second picking unit; wherein, the first inverter and second inverter are in electrical communication with the controller. In a fourth example, the cotton harvester may include a hydraulic pump operably driven by the drive unit; a first hydraulic valve fluidly coupled to the hydraulic pump, the first hydraulic valve hydraulically controlling the front doffer drive unit and rear doffer drive unit of the first picking unit; and a second hydraulic valve fluidly coupled to the hydraulic pump, the second hydraulic valve hydraulically controlling the front doffer drive unit and rear doffer drive unit of the second picking unit.

In another example, the plurality of picking units includes a first picking unit and a second picking unit; the doffer assembly of the first picking unit includes a first front doffer assembly and a first rear doffer assembly; the doffer assembly of the second picking unit includes a second front doffer assembly and a second rear doffer assembly; the doffer drive unit of the first picking unit operably drives the first front doffer assembly and the first rear doffer assembly; and the doffer drive unit of the second picking unit operably drives the second front doffer assembly and the second rear doffer assembly.

In a further example of this embodiment, the cotton harvester may include a hydraulic pump operably driven by the drive unit; a first picking unit of the plurality of picking units, the first picking unit including a first front doffer assembly and a first rear doffer assembly, where the doffer drive unit operably drives the first rear doffer assembly; a second picking unit of the plurality of picking units, the second picking unit including a second front doffer assembly and a second rear doffer assembly; and a hydraulic valve fluidly coupled to the hydraulic pump, the hydraulic valve hydraulically controlling the first doffer drive unit; wherein, the first front doffer assembly and the first rear doffer assembly are mechanically coupled to one another, and the second front doffer assembly and the second rear doffer assembly are mechanically coupled to one another; wherein, the first rear doffer assembly and the second rear doffer assembly are mechanically coupled to one another; further wherein, the second front doffer assembly and the second rear doffer assembly are rotatably driven by the doffer drive unit via the mechanical coupling between the first rear doffer assembly and the second rear doffer assembly.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
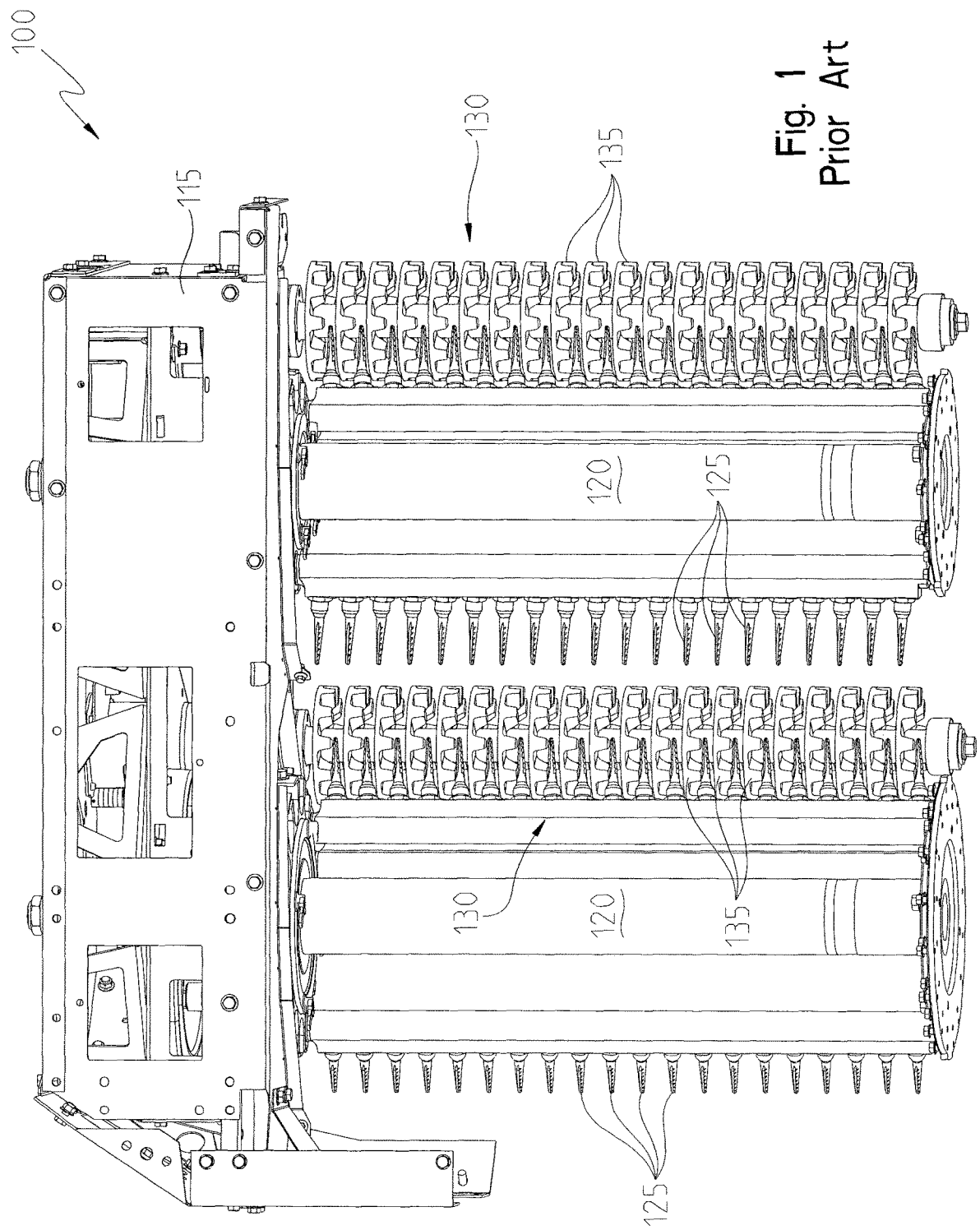
FIG. 1 is a perspective view of a portion of a conventional cotton harvester unit.
Figure 3:
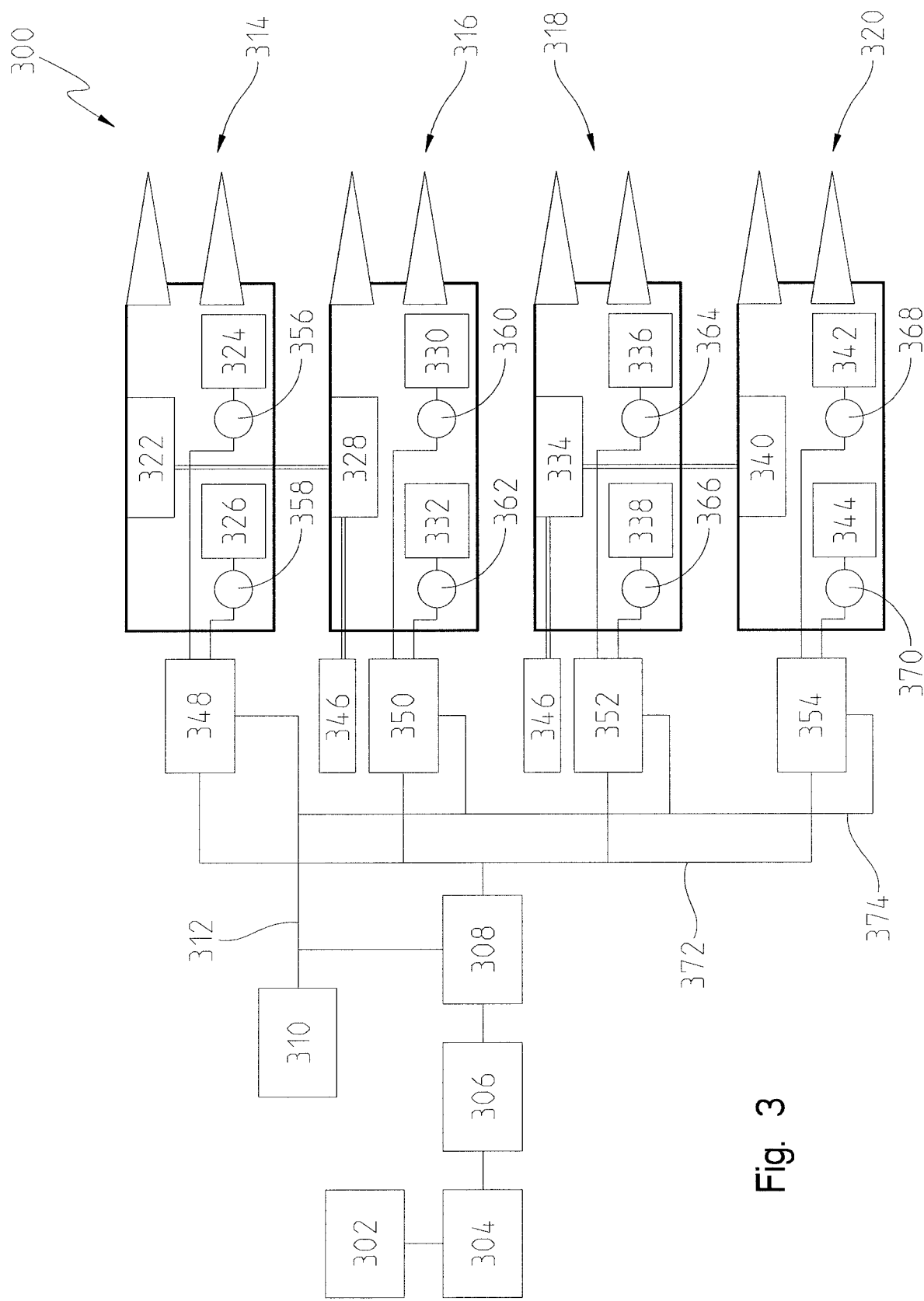
FIG. 3 is a control schematic of a first embodiment of an independent drive system.

Referring to FIG. 1, a conventional cotton harvester unit 100 is illustrated. The illustrated cotton harvester unit 100 may include a plurality of picking units. In FIG. 3, for example, the cotton harvester unit may include up to six different picking units. Other machines may include a different number of picking units. In any event, each unit may include a frame 115. A drum 120 is rotatably coupled to the frame 115. In at least one picking unit, there may be a front drum 120 and a rear drum 120. A plurality of rows of spindles 125 is rotatably coupled to each drum 120. A doffer column 130 having a plurality of doffers 135 is rotatably supported by a bearing housing (not shown). The plurality of doffers 135 is positioned adjacent the spindles 125 and configured to remove cotton from the spindles 125. The bearing housing (not shown) may be threadably engaged with a fixed housing (not shown), which is coupled to the frame 115.

In the conventional system of FIG. 1, power comes into a gearbox and transfers via an output shaft to an idler gear stack (not shown). The power is split between the drum and spindles. A gear connects the doffers to the spindles such that a relationship between the speeds of the doffers and spindles is maintained. In this system, the doffers and spindles are rotationally driven by the same drive system.

Figure 2:
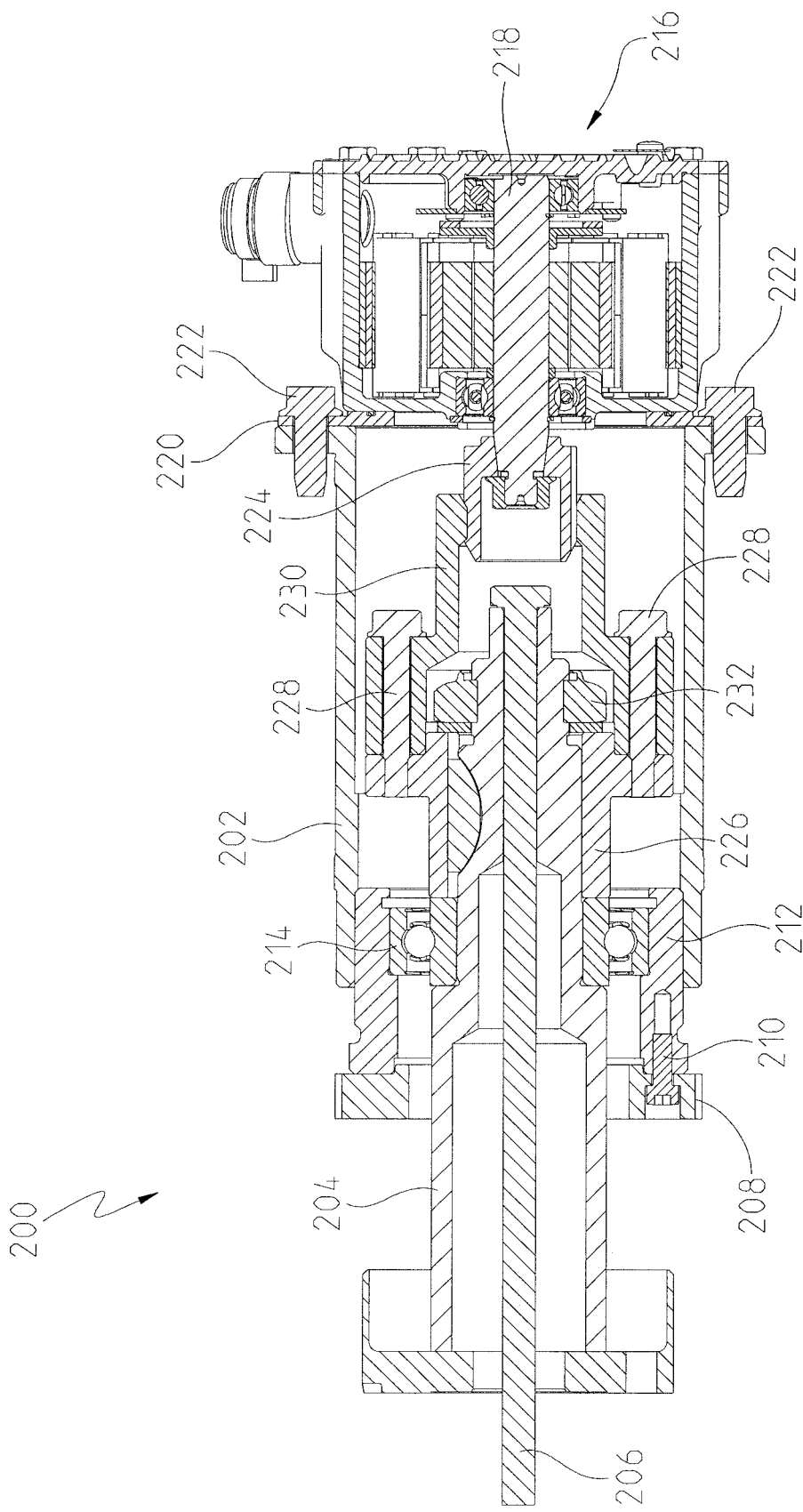
FIG. 2 is a side cross-sectional view of an independent doffer drive system.

Referring to FIG. 2, one embodiment of an independent doffer drive system 200 is illustrated. In this embodiment, the system includes an outer doffer housing 202 and a top cover 220 that define an inner cavity in which a doffer adjustment device including a shaft 204 is disclosed. The top cover 220 may be coupled to the doffer housing 202 via one or more fasteners 222. For purposes of this disclosure, the doffer adjustment device may be similar to that disclosed in U.S. Pat. No. 8,572,941 to Deere & Company.

A doffer retention bolt 206 may extend vertically through the doffer adjustment shaft 204 an inner cavity of the doffer housing 202. The doffer adjustment device may further include a doffer adjustment ring gear 208. The ring gear 208 may be removably coupled to a bearing housing 212 via one or more fasteners 210. The bearing housing 212 may define a location to substantially enclose a bearing 214, such as a roller bearing, which provides support to the adjustment shaft 204. A locknut or fastener 232 may also substantially surround the doffer adjustment shaft 204 as shown in FIG. 2.

As also shown, the system 200 may include a drive unit 216. In this embodiment, the drive unit 216 is shown as an electric motor. The electric motor may include a motor shaft 218 for providing input power to the doffer unit. In this embodiment, the drive unit 216 and shaft 218 are axially aligned with the doffer housing 202 and plurality of doffers (not shown). In this manner, the motor shaft 218 is disposed along a vertical axis defined therethrough, and a doffer column may be arranged axially along the vertical axis. Power from the motor may be transferred from the shaft 218 to a motor coupler 224. The motor coupler 224 may include internal splines that are coupled to corresponding splines on the motor shaft 218. Likewise, the motor coupler 224 may include external splines or a tapered shaft with a key that are coupled to a complimentary coupler 230. The driven coupler 230 may be further coupled to a coupler interface adapter 226 via one or more fasteners 228 such as bolts, screws, and the like. The coupler interface adapter 226, or second coupler, may replace a conventional doffer driven gear that is present in the embodiment of FIG. 1. Conventionally, the doffer driven gear receives mechanical power from the gear stack to drive the doffer unit. In the embodiment of FIG. 2, however, electrical power from the electric motor 216 drives the doffer unit independently from the drum and spindle drive.

While an electric motor is depicted in FIG. 2 as the drive unit, for purposes of this disclosure any known type of drive unit may be used to drive the doffer unit. For instance, the doffer system may be driven electrically, hydraulically, or mechanically. Examples of these different embodiments are shown in FIGS. 3-7.

One of the advantages of an electric motor is its ability to provide integrated speed and load sensing outputs. As will be described, this may be implemented by a single motor on each doffer, or a single motor for driving a front and a rear doffer in a single row unit. This independent drive, through integrated doffer load sensing, may provide feedback for a self-adjusting doffer. It may also provide feedback for doffer plug detection and automatic plug clearing. In conventional row unit systems, such as the one show in FIG. 1, the drum, spindles, and doffers may be rotatably driven in a reverse direction to assist with unplugging cotton from the spindles. This, however, sometimes would further wind the cotton around the spindles, and a machine operator may have to manually assist with unplugging the cotton from the spindles. By independently driving the doffer system, the doffers may continue to rotate in the forward direction while the drum and spindles may be rotatably driven in the reverse direction to clear the plugged cotton from the row unit.

In addition to clearing the plugged cotton, the independent doffer drive system may further detect the plugged condition. With an electric motor and inverter system, such as the one illustrated in FIGS. 3 and 4, the system may detect current draw of the motor. Besides current, motor speed and direction of rotation may also be monitored. An inverter may control the motor via current draw and detect the type or amount of load on the motor. When cotton plugs, the inverter may detect an increase in current needed to drive the motor or a decrease in motor speed. The inverter may take the form of an inverter controller and function both as a controller for controlling the motor operation and inverting current into a three-phase. By controlling the motor, the inverter may receive inputs from the motor and compare the inputs to threshold values to determine a plugged condition. As will be described below, the inverter may be electrically coupled to a Controller Area Network (CAN bus) for communicating with other controllers. In this manner, other controllers may detect the plugged condition based on information communicated over the CAN by the inverter.

The inverter and electric motor system may also provide the benefit of a doffer health indicator. As is known, the plurality of spindles of a row unit are rotationally driven and pass beneath the doffers of the doffer system. In doing so, the doffers contact and remove the cotton from the spindles. However, over a period of time, the doffers may begin to wear. In particular, a leading edge or corner of the doffer may begin to wear such that it may round off or develop a radius. As the doffer leading edge begins to round off, its doffing efficiency can decrease. With a decreased doffing efficiency, the doffer may be prone to wrap the cotton around the spindles rather than remove it. If not properly maintained, a load can be imposed on the doffer drive system for driving the doffer.

With the load sensing capability of the electric motor and inverter, a worn doffer may be detected by comparing the loads on the motor to a threshold load. If the detected load exceeds the load threshold, then the inverter controller or another system controller may detect a worn doffer. The worn doffer may be replaced or appropriate maintenance may be carried out. As for the load, the motor torque may gradually increase over time as the doffer wears. By contrast, if cotton plugs the system, the motor torque may increase instantly or much quicker than when doffer wear is detected. In any event, the health of the doffer system may be detectable by the independent doffer drive system.

For purposes of this disclosure, an electric drive system is only one of several embodiments contemplated herein. An independently controlled hydraulic doffer drive system is also possible. In this embodiment, hydraulic pressure may be measured to detect a plugged condition or doffer wear, and the pressure may be compared to a pressure threshold. With a hydraulic system, load and speed sensing may be executed by pressure and speed sensors, respectively.

Moreover, an independent mechanical doffer drive system is also possible. Here, power shafts may transfer power from a centralized or main drive system. A gear case may then transfer the mechanical power to the row units. Other means may be possible including gears, for example.

Referring now to FIG. 3, a first embodiment of a control system 300 for controlling an independent doffer drive system of a cotton harvester unit is shown. The harvester unit may include a main drive unit such as an engine 302. The engine 302 may produce mechanical power that drives a gearbox or auxiliary drive unit 304. The mechanical power from the engine 302 may be converted to electrical power via a generator unit 306. Various electronics 308 may allow for voltage control to control a plurality of different picking units, which will be described below.

The control system 300 may include a main controller 310 such as a head interface controller (HIC). The main controller 310 may be in electrical communication with the generator unit 306 and electronics 308 via a communication network such as a CAN bus 312. The main controller 310 may communicate to or receive voltage commands from the electronics 308. In any event, electrical power may be supplied to the plurality of picking units as shown in FIG. 3.

In this embodiment, the cotton harvester unit may include four picking units, namely, a first picking unit 314, a second picking unit 316, a third picking unit 318, and a fourth picking unit 320. In another embodiment, however, there may be six picking units. In a further embodiment, there may be two picking units. The present disclosure is not limited to any number of picking units, and thus the independent doffer drive may be incorporated into any number of picking units based on the teachings of the present disclosure.

Figure 4:
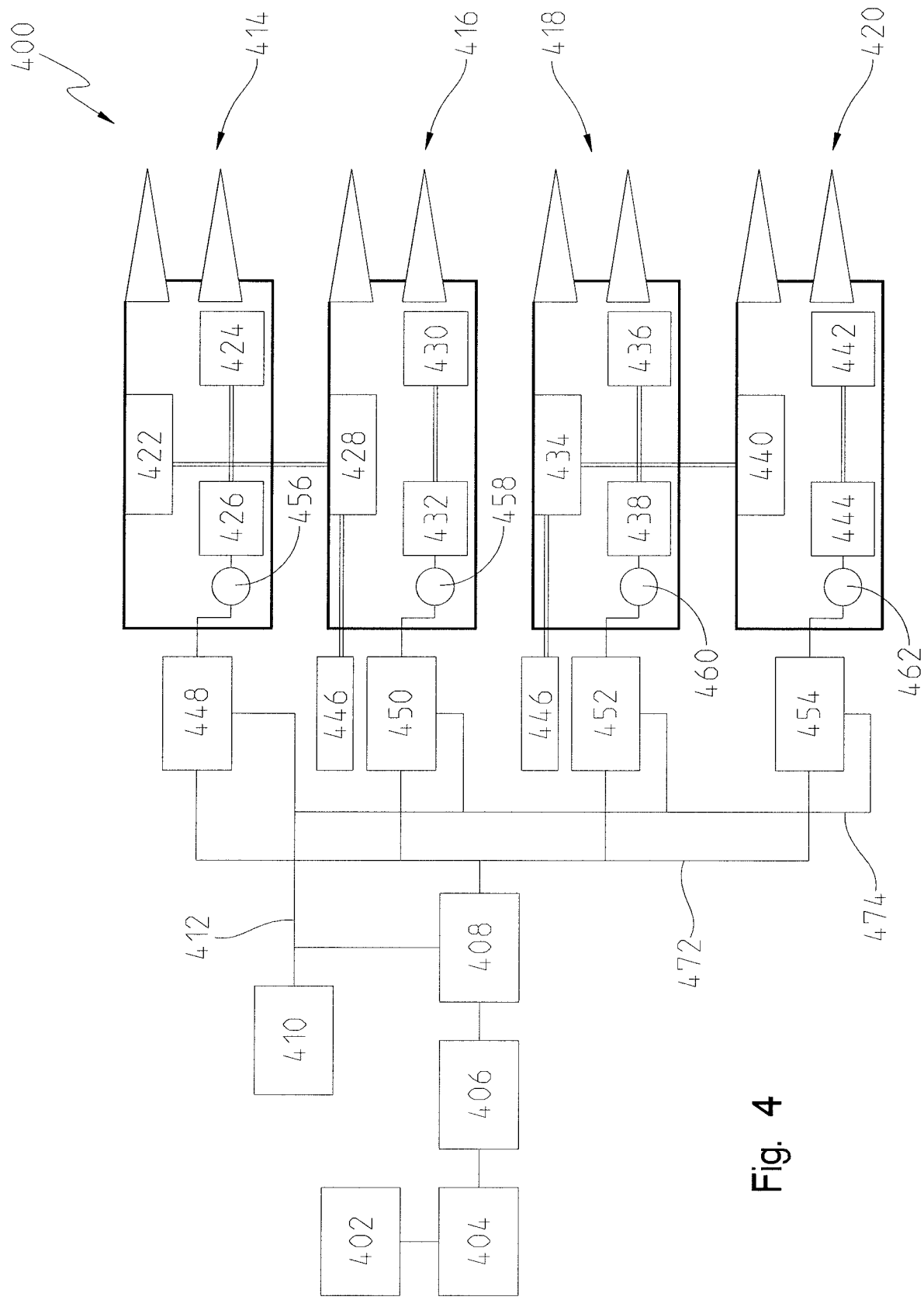
FIG. 4 is a control schematic of a second embodiment of an independent drive system.

Each picking unit may include a spindle and drum drive and a front and rear doffer drive assembly. In one such example, the picking unit may include a front drum and a rear drum. In this example, a plurality of spindles may be rotatably driven by the front drum and a plurality of spindles may be rotatably driven by the rear drum. In any event, the front doffer drive assembly and rear doffer drive assembly may be independent from the drum and spindle drive. In FIG. 3, for example, the first picking unit 314 may include a drum and spindle drive 322, a front doffer assembly 324, a front doffer drive unit 356, a rear doffer drive unit 358, and a rear doffer assembly 326. For purposes of orientation, "front" is intended to refer to a front end of the picking unit, and "rear" is intended to refer to a rear end of the picking unit. Moreover, for purposes of this disclosure, "doffer drive assembly" may include the doffer assembly similar to that illustrated in FIG. 2 and a drive unit such as an electric or hydraulic motor. The doffer assembly may include a plurality of doffers arranged in a column similar to that in FIG. 1, where the plurality of doffers are arranged adjacent to a plurality of spindles for doffing cotton therefrom. As will be described below, the doffer assembly may be independently driven by the doffer drive unit, which in FIGS. 3-4 is shown as electric motors and in FIGS. 5-7 as hydraulic motors.

The second picking unit 316 may include a drum and spindle drive 328, a front doffer assembly 330, and a rear doffer assembly 332. Likewise, the third picking unit 318 may include a drum and spindle drive 334, a front doffer assembly 336, and a rear doffer assembly 338. Further, the fourth picking unit 320 may include a fourth drum and spindle drive 340, a front doffer assembly 342, and a rear doffer assembly 344.

As in a conventional harvester unit, each drum and spindle drive may be mechanically driven by a mechanical power unit 346. For instance, the engine 302 may provide mechanical power to a gear case which provides power to the drum and spindle drives. In FIG. 3, mechanical power 346 may be provided to the second drum and spindle drive 328, which is mechanically coupled to the first drum and spindle drive 322. As such, mechanical power 346 is transferred through a first flow path to the first and second drum and spindle drives of the first and second picking units, respectively. Likewise, mechanical power 346 may be transferred through a second flow path to the third and fourth drum and spindle drives of the third and fourth picking units, respectively. Thus, there is a mechanical coupling between the first and second picking units and the third and fourth picking units.

The independent doffer drive system of FIG. 3 includes a controller/inverter for each picking unit. For example, the first picking unit 314 includes a first controller/inverter 348. Similarly, the second picking 316 includes a second controller/inverter 350, the third picking unit 318 includes a third controller/inverter 352, and the fourth picking unit 320 includes a fourth controller/inverter 354. Each controller/inverter may function in a manner similar to that previously described. Moreover, each controller/inverter may include dual outputs, or it may be a dual controller/inverter each with individual outputs.

In the embodiment of FIG. 3, the front and rear doffer assemblies may be electrically driven by its own electric motor. For example, in the first picking unit 314, the front doffer assembly 324 may be electrically powered by a first front motor 356 and the rear doffer assembly 326 may be electrically powered by a first rear motor 358. The first front motor 356 and first rear motor 358 may be in electrical communication with the first controller/inverter 348. In one aspect, wires or cables may electrically couple each motor to the first controller/inverter 348. In a different aspect, the controller/inverter may wirelessly communicate with each motor.

Similar to the first picking unit, the second front doffer assembly 330 may be electrically powered by a second front motor 360. The second rear doffer assembly 332 may be electrically powered by a second rear motor 362. The front motor 360 and rear motor 362 may each be electrically coupled or at least in electrical communication with the second controller/inverter 350. Electrical wires or cables may electrically couple the second controller/inverter 350 to each of the second motors, or communication may be via wireless communication.

In the third picking unit 318, the third front doffer assembly 336 may be electrically driven by a third front motor 364, and the third rear doffer assembly 338 may be electrically driven by a third rear motor 366. In each case, the doffer assemblies are electrically driven independently of the drum and spindle drive. The front and rear electric motors of the third picking unit 318 may be electrically coupled or at least in electrical communication with the third controller/inverter 352. Electrical communication may be via cables or wires or wirelessly.

In the fourth picking unit 320, the fourth front doffer assembly 342 may be electrically powered by a fourth front motor 368. The fourth rear doffer assembly 344 may be electrically powered by a fourth rear motor 370. The front motor 368 and rear motor 370 may each be electrically coupled or at least in electrical communication with the fourth controller/inverter 354. Electrical wires or cables may electrically couple the fourth controller/inverter 354 to each of the fourth motors, or communication may be via wireless communication.

In each picking unit, the respective controller/inverter may be electrically coupled or in electrical communication via electrical communication line 372 with the generator unit 306 and electronics 308. Moreover, each controller/inverter may be in communication with the main controller 310 via the CAN bus 312 or any other communication line. The controller/inverter of each picking unit may receive from or send commands via a command line 374 to the main controller 310. These commands may relate to inputs received from each motor. Inputs may include torque, speed, temperature, etc.

Thus, in the illustrated embodiment of FIG. 3, each front doffer assembly is electrically powered by a front electric motor, and each rear doffer assembly is electrically powered by a rear electric motor. Turning to FIG. 4, however, is a related embodiment in which the independent doffer assemblies are electrically powered by a single electric motor. For sake of simplicity, reference numbers are similar between the embodiments of FIGS. 3 and 4 as it relates to the different system components.

In FIG. 4, a control system 400 for a cotton harvester unit is illustrated. Similar to the control system 300 of FIG. 3, the control system 400 in FIG. 4 may include a main controller 410. The cotton harvester unit may include a drive unit such as an engine 402 that provides mechanical power 446 to a gearbox or auxiliary drive unit 404. A generator unit 406 may convert the mechanical power to electrical power, and electronics 408 for voltage command may be in electrical communication with the main controller 410.

The harvester unit may include a plurality of picking units. Similar to the embodiment of FIG. 3, the plurality of picking units in FIG. 4 may include a first picking 414, a second picking 416, a third picking unit 418, and a fourth picking 420. Each picking unit may include its own controller/inverter that is disposed in electrical communication via an electrical line 472 to the generator unit 406 and electronics 408. Moreover, the main controller 410 may communicate with each controller/inverter via a CAN bus 412.

The first picking unit 414 may include a first controller/inverter 448, a first drum and spindle drive 422, a first front doffer assembly 424 and a first rear doffer assembly 426. The second picking unit 416 may include a second controller/inverter 450, a second drum and spindle drive 428, a second front doffer assembly 430, and a second rear doffer assembly 432. The first drum and spindle drive 422 may be mechanically coupled to the second drum and spindle drive 428, as shown in FIG. 4. Mechanical power 446, e.g., from the engine 402, may mechanically power the drum and spindle drives. Alternatively, other power sources (including electric or hydraulic) may drive the drum and spindle drives.

The third picking unit 418 may include a third controller/inverter 452, a third drum and spindle drive 434, a third front doffer assembly 436, and a third rear doffer assembly 438. The fourth picking unit 420 may include a fourth controller/inverter 454, a fourth drum and spindle drive 440, a fourth front doffer assembly 442, and a fourth rear doffer assembly 444. The third drum and spindle drive 434 may be mechanically coupled to the fourth drum and spindle drive 440, as shown in FIG. 4. Mechanical power 446, e.g., from the engine 402, may mechanically power the drum and spindle drives. Alternatively, other power sources (including electric or hydraulic) may drive the drum and spindle drives.

The control system 400 of FIG. 4 differs from that in FIG. 3 in that only a single electrical motor is provided for each picking unit. For example, the first front doffer assembly 424 and the first rear doffer assembly 426 are electrically powered by a single electrical motor 456. It is still worth noting that the doffer assemblies are electrically powered independently from the drum and spindle drive 422, but rather than each doffer assembly being powered by an independent motor, the first motor 456 electrically powers both the first front doffer assembly 424 and the first rear doffer assembly 426. The same is true with respect to the other picking units. For example, a second electrical motor 458 electrically powers the second front doffer assembly 430 and the second rear doffer assembly 432. A third electrical motor 460 electrically powers the third front doffer assembly 436 and the third rear doffer assembly 438. Moreover, a fourth electrical motor 462 electrically powers the fourth front doffer assembly 442 and the fourth rear doffer assembly 444.

Each controller/inverter may be electrically coupled or at least in electrical communication with each respective motor. The motor may send inputs to the controller/inverter related to a load (e.g., torque), speed, temperature or other input. The controller/inverter may send or receive commands via a command line 474 to another controller/inverter or the main controller 410. Alternatively, communication may be via the CAN bus 412. In any event, the same functionality and benefits may be achieved with the single motor per row unit system as shown in FIG. 4.

In the illustrated embodiment of FIG. 4, it is further shown that the front and rear doffer assemblies are mechanically coupled to one another. In other words, the electric motor may electrically power either the front or rear doffer assembly, and the other doffer assembly is mechanically coupled to the hydraulically driven doffer assembly. The mechanical coupling (e.g., shafts, gears, etc.) allows a single electric motor to electrically power both doffer assemblies simultaneously.

Although not shown, another embodiment of an independent electrically-powered doffer drive system may include a single motor for powering all of the front and rear doffer assemblies of the cotton harvester unit. In other words, rather than each picking unit having its own electric motor, in this embodiment there is only one motor for powering all of the doffer assemblies. Taking FIG. 4 for example, in this embodiment a single motor would replace the first motor 456, second motor 458, third motor 460, and fourth motor 462. The single motor would electrically power the front and rear doffer assemblies of the first, second, third and fourth picking units. In this embodiment, there may only be a single controller/inverter for the single motor.

Figure 5:
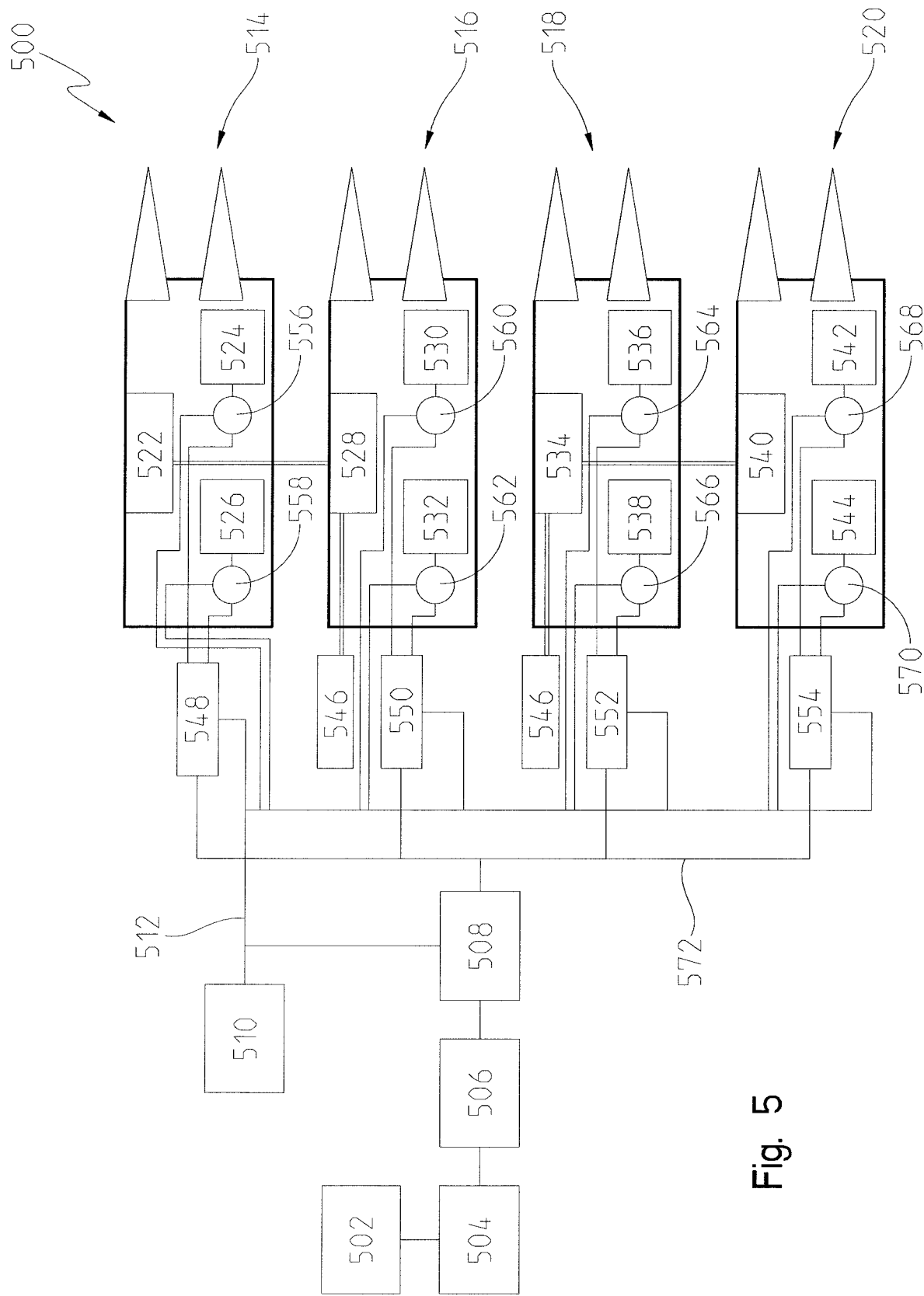
FIG. 5 is a control schematic of a third embodiment of an independent drive system.

Referring to FIG. 5, a different embodiment of a cotton harvester unit will now be described. Here, a control system 500 is provided in which an independent doffer drive is powered hydraulically rather than electrically. In this embodiment, the cotton harvester unit may include a drive unit such as an engine 502 for providing mechanical power to a coupling gearbox or auxiliary drive unit 504. The power may be transferred for driving a hydraulic pump 506. An electrical control valve 508 may also be included and which is in communication with a main controller 510 or HIC. Communication may be via a CAN link 512 or other communication link. In any event, the pump 506 may provide hydraulic power via hydraulic lines 572 to a plurality of picking units.

In FIG. 5, the plurality of picking units may include a first picking unit 514, a second picking 516, a third picking unit 518, and a fourth picking 520. Each picking unit includes a drum and spindle drive, a front doffer assembly and a rear doffer assembly. In the first picking unit 514, for example, a first drum and spindle drive 522, a first front doffer assembly 524 and a first rear doffer assembly 524 are provided. The second picking 516 may include a second drum and spindle drive 528, a second front doffer assembly 530 and a second rear doffer assembly 532. The third picking unit 518 may include a drum and spindle drive 534, a front doffer assembly 536 and a rear doffer assembly 538. The fourth picking unit 520 may include a drum and spindle drive 540, a front doffer assembly 542, and a rear doffer assembly 544.

In this embodiment, mechanical power 546 may be provided by the engine 502 to mechanically power the drum and spindle drives. In FIG. 5, for example, the first and second drum and spindle drives 522, 528 may be mechanically coupled to one another, and the third and fourth drum and spindle drives 534, 540 may be mechanically coupled to one another. In a different embodiment, all of drum and spindle drives may be mechanically coupled to one another.

Each picking unit may include its own hydraulic valves which receive hydraulic power from the pump 506. For instance, a first hydraulic valve or valves 548 may be provided for the first picking unit 514. The second picking unit 516 may include a second hydraulic valve or valves 550, the third picking unit 518 may include a third hydraulic valve or valves 552, and the fourth picking unit 520 may include a fourth hydraulic valve or valves 554.

Each of the hydraulic valve or valves may be hydraulically coupled to a front hydraulic motor and a rear hydraulic motor for each picking unit. In FIG. 5, the hydraulic motors are illustrated as being hydraulically plumbed in parallel with respect to one another. In another embodiment, however, the front and rear motors may be hydraulically plumbed in series.

As shown, the first hydraulic valve or valves 548 may provide hydraulic fluid to a first front hydraulic motor 556 and a first rear hydraulic motor 558. The front hydraulic motor 556 may hydraulically power the front doffer assembly 524, and the rear hydraulic motor 558 may hydraulically power the rear doffer assembly 526. The second hydraulic valve or valves 550 may provide hydraulic fluid to a second front hydraulic motor 560 and a second rear hydraulic motor 562. The front hydraulic motor 560 may hydraulically power the front doffer assembly 530, and the rear hydraulic motor 562 may hydraulically power the rear doffer assembly 532. Similarly, the third hydraulic valve or valves 552 may provide hydraulic fluid to a third front hydraulic motor 564 and a third rear hydraulic motor 566. The front hydraulic motor 564 may hydraulically power the front doffer assembly 536, and the rear hydraulic motor 566 may hydraulically power the rear doffer assembly 538. Lastly, the fourth hydraulic valve or valves 554 may provide hydraulic fluid to a fourth front hydraulic motor 568 and a fourth rear hydraulic motor 570. The front hydraulic motor 568 may hydraulically power the front doffer assembly 542, and the rear hydraulic motor 570 may hydraulically power the rear doffer assembly 544.

In each picking unit, the hydraulic valve or valves may be hydraulically coupled to the front and rear motors via a supply line and a return line. Moreover, a pressure or speed sensor (not shown) may be part of the control system for measuring a fluid pressure, flow rate, or rotational speed of each doffer drive. The sensor(s) may be in communication with the main controller 510 for controlling operation of the valves and hydraulic motors. Commands and feedback may be communicated to or from the valves via the CAN bus 512. This communication may relate to pressure or flow, for example. In any event, a plugged condition or doffer wear may be detected by the main controller 510 due to communication with the valves and sensors.

Figure 6:
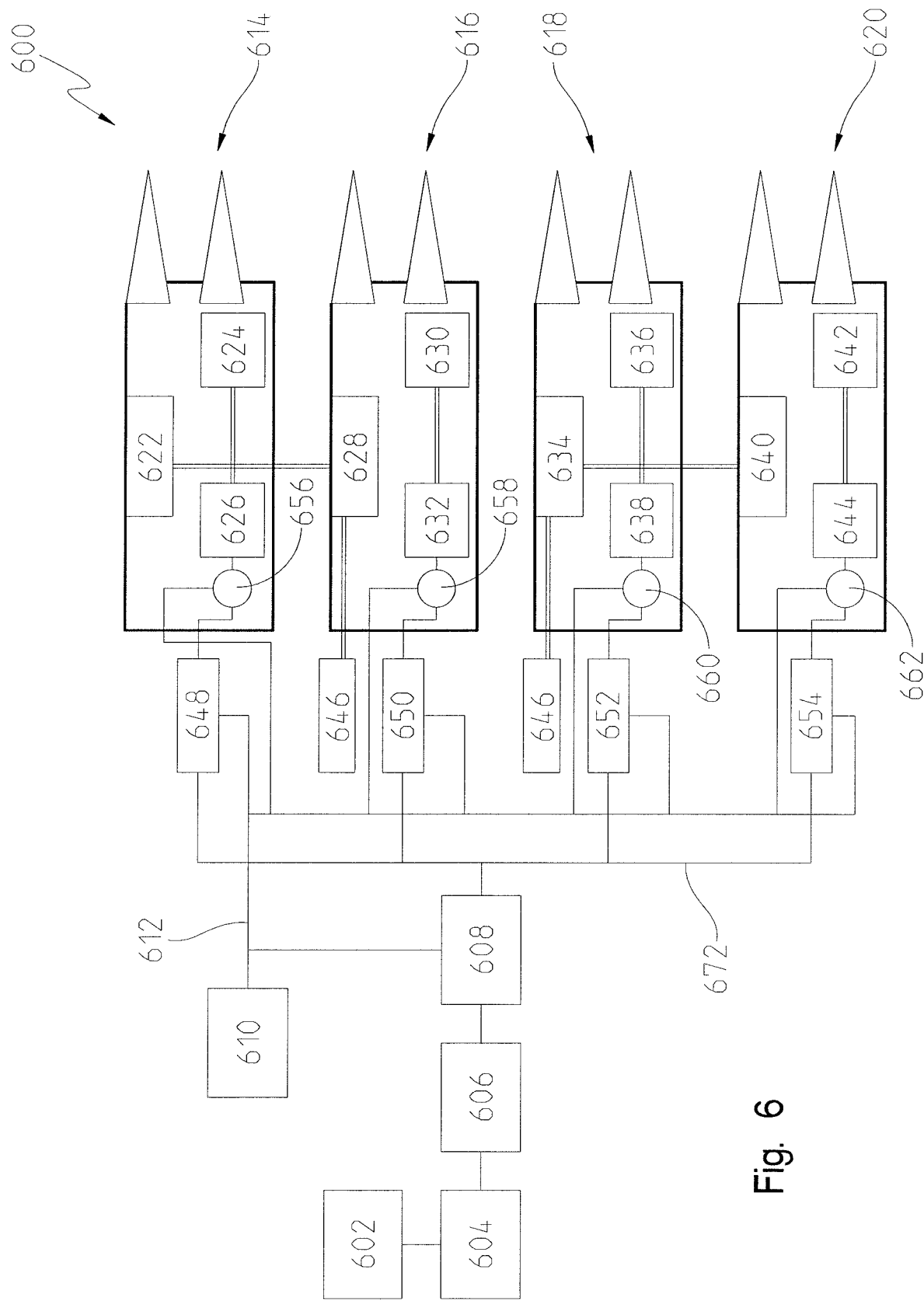
FIG. 6 is a control schematic of a fourth embodiment of an independent drive system.

In FIG. 6, a related embodiment for independent hydraulic control of the doffer drives is shown. Here, many of the same components form a control system 600 similar to that in FIG. 5. In this system, however, a single motor drives the front and rear doffer assemblies in each picking unit. Thus, this embodiment is similar to that of FIG. 4 in which each picking unit includes a single motor.

In the illustrated embodiment of FIG. 6, the cotton harvester unit may include a drive unit such as an engine 602 for providing mechanical power to a coupling gearbox or auxiliary drive unit 604. The power may be transferred for driving a hydraulic pump 606. An electrical control valve 608 may also be included and which is in communication with a main controller 610. Communication may be via a CAN link 612 or other communication link. In any event, the hydraulic pump 606 may provide hydraulic fluid via hydraulic lines 672 to a plurality of picking units.

In FIG. 6, the plurality of picking units may include a first picking unit 614, a second picking 616, a third picking unit 618, and a fourth picking 620. Each picking unit includes a drum and spindle drive, a front doffer assembly and a rear doffer assembly. In the first picking unit 614, for example, a first drum and spindle drive 622, a first front doffer assembly 624 and a first rear doffer assembly 624 are provided. The second picking 616 may include a second drum and spindle drive 628, a second front doffer assembly 630 and a second rear doffer assembly 632. The third picking unit 618 may include a drum and spindle drive 634, a front doffer assembly 636 and a rear doffer assembly 638. The fourth picking unit 620 may include a drum and spindle drive 640, a front doffer assembly 642, and a rear doffer assembly 644.

In this embodiment, mechanical power 646 may be provided by the engine 602 to mechanically power the drum and spindle drives. In FIG. 6, for example, the first and second drum and spindle drives 622, 628 may be mechanically coupled to one another, and the third and fourth drum and spindle drives 634, 640 may be mechanically coupled to one another. In a different embodiment, all of drum and spindle drives may be mechanically coupled to one another.

Each picking unit may include its own hydraulic valves which receive hydraulic power from the pump 606. For instance, a first hydraulic valve or valves 648 may be provided for the first picking unit 614. The second picking unit 616 may include a second hydraulic valve or valves 650, the third picking unit 618 may include a third hydraulic valve or valves 652, and the fourth picking unit 620 may include a fourth hydraulic valve or valves 654.

Each of the hydraulic valve or valves may be hydraulically coupled to a front hydraulic motor and a rear hydraulic motor for each picking unit. In FIG. 6, the hydraulic motors are illustrated as being hydraulically plumbed in parallel with respect to one another. In another embodiment, however, the front and rear motors may be hydraulically plumbed in series.

As shown, the first hydraulic valve or valves 648 may provide hydraulic fluid to a first hydraulic motor 656. The first hydraulic motor 656 may hydraulically power the front doffer assembly 624 and the rear doffer assembly 626. The second hydraulic valve or valves 650 may provide hydraulic fluid to a second hydraulic motor 658. The second hydraulic motor 658 may hydraulically power the front doffer assembly 630 and the rear doffer assembly 632. Similarly, the third hydraulic valve or valves 652 may provide hydraulic fluid to a third hydraulic motor 660. The third hydraulic motor 660 may hydraulically power the front doffer assembly 636 and the rear doffer assembly 638. Lastly, the fourth hydraulic valve or valves 654 may provide hydraulic fluid to a fourth hydraulic motor 662, which in turns may hydraulically power the front doffer assembly 642 and the rear doffer assembly 644.

In each picking unit, the hydraulic valve or valves may be hydraulically coupled to the respective motor via a supply line and a return line. Moreover, a pressure or speed sensor (not shown) may be part of the control system for measuring a fluid pressure, flow rate, or rotational speed of each doffer drive. The sensor(s) may be in communication with the main controller 610 for controlling operation of the valves and hydraulic motors. Commands and feedback may be communicated to or from the valves via the CAN bus 612. This communication may relate to pressure or flow, for example. In any event, a plugged condition or doffer wear may be detected by the main controller 610 due to communication with the valves and sensors.

In the illustrated embodiment of FIG. 6, it is further shown that the front and rear doffer assemblies are mechanically coupled to one another. In other words, the hydraulic motor may hydraulically power either the front or rear doffer assembly, and the other doffer assembly is mechanically coupled to the hydraulically driven doffer assembly. The mechanical coupling (e.g., shafts, gears, etc.) allows a single hydraulic motor to hydraulically power both doffer assemblies simultaneously.

In FIG. 6, each picking unit includes its own hydraulic motor. In another but related embodiment, there may be a single hydraulic motor for hydraulically powering the front and rear doffer assemblies of all of the picking units. In this embodiment, a single hydraulic valve or valves may be in fluid communication with the pump and the single hydraulic motor. Supply and return hydraulic lines may be coupled between the single valve or valves and the single motor.

Figure 7:
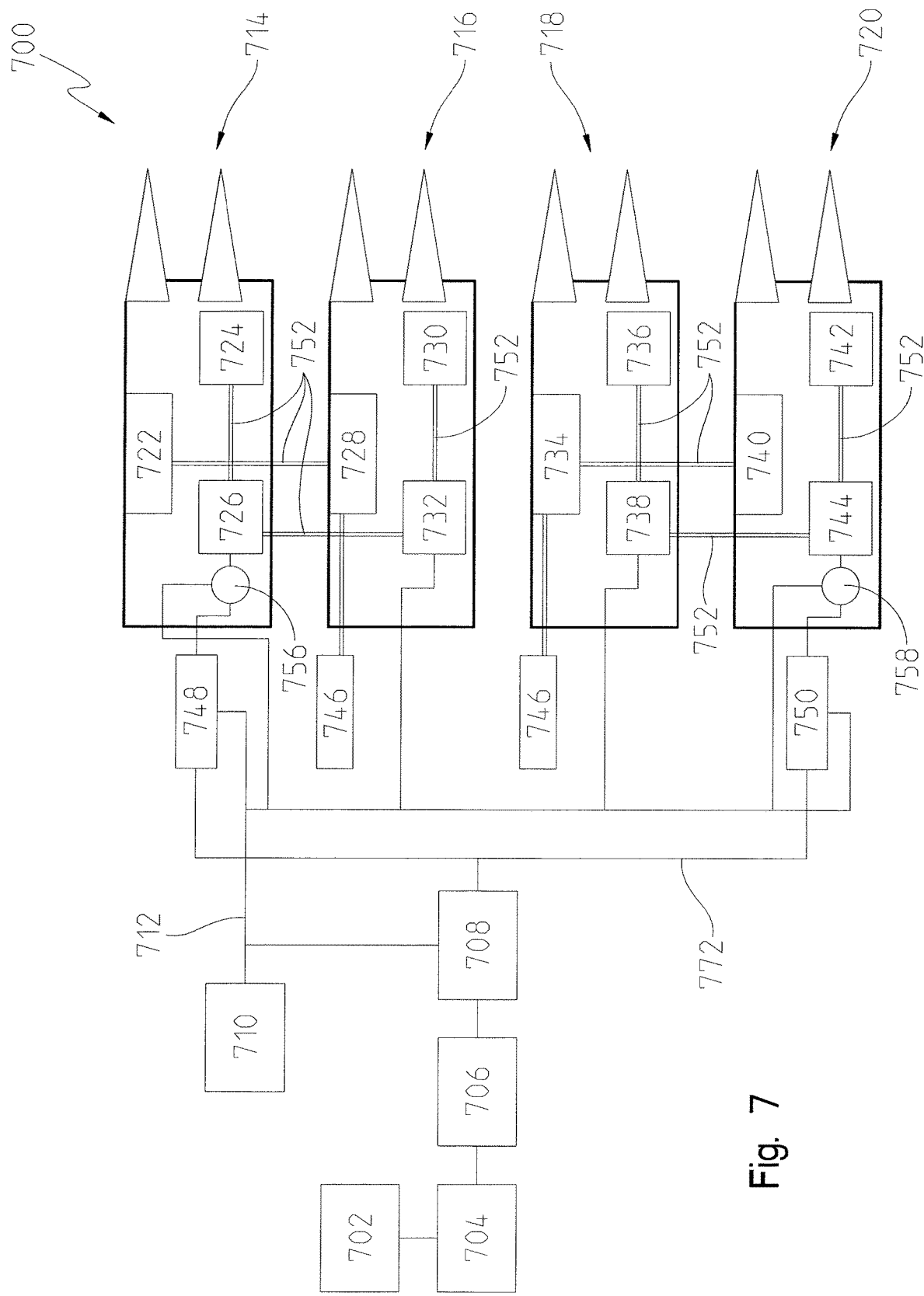
FIG. 7 is a control schematic of a fifth embodiment of an independent drive system.

Referring to FIG. 7, a different embodiment of a cotton harvester unit and independent doffer drive system is shown. In this system, a control system 700 is provided for independent mechanical doffer drive capability. The control system 700 may include a main controller 710 and the harvester unit may include a drive unit such as an engine 702 for providing mechanical power. The engine 702 may provide mechanical power to a gearbox or auxiliary drive unit 704 for driving a hydraulic pump 706. An electronic control valve 708 may be in electrical communication with the main controller 710 via a wireless link, a wired link, or a CAN bus 712. The hydraulic pump 706 may provide hydraulic power via a fluid link 772 to a first hydraulic valve or valves 748 and a second hydraulic valve or valves 750. The valves will be described in further detail below.

Similar to the previously described embodiments, the cotton harvester unit may include a plurality of picking units. Any number of picking units may be provided, and this disclosure is not limited to any particular number. In FIG. 7, a first picking unit 714, a second picking unit 716, a third picking unit 718, and a fourth picking unit 720 are provided. Each picking unit may include its own drum and spindle drive, a front doffer assembly and a rear doffer assembly. In other embodiments, there may only be a single drum drive, a single spindle drive, and a single doffer assembly.

The first picking unit 714 may include a first drum and spindle drive unit 722, a first front doffer assembly 724, and a first rear doffer assembly 726. The second picking unit 716 may include a second drum and spindle drive 728, a second front doffer assembly 730, and a second rear doffer assembly 732. The third picking unit 718 may include a third drum and spindle drive 734, a third front doffer assembly 736, and a third rear doffer assembly 738. The fourth picking unit 720 may include a fourth drum and spindle drive 740, a fourth front doffer assembly 742, and a fourth rear doffer assembly 744.

The drum and spindle drives may be mechanically powered. For example, mechanical power 746 may be provided by the engine 702 to mechanically power each drum and spindle drive. The first drum and spindle drive 722 may be mechanically coupled to the second drum and spindle drive 728 via mechanical link 752. The mechanical link 752 may include gears, shafts, gearsets, etc. for transferring mechanical power. Similarly, the third drum and spindle drive 734 may be mechanically coupled to the fourth drum and spindle drive 740, as shown. Here, mechanical power 746 from the engine 702 may be provided to the third drum and spindle drive 734, and mechanical power may be transferred via mechanical link 752 to the fourth drum and spindle drive 740. Thus, there is a mechanical coupling of drum and spindle drives between row units.

In FIG. 7, the first valve or valves 748 may provide hydraulic fluid to drive a first hydraulic motor 756. Likewise, the second valve or valves 750 may provide hydraulic fluid to drive a second hydraulic motor 758. A supply and return line may be provided between the respective valve or valves and hydraulic motor.

The first valve or valves 748 may provide hydraulic fluid to drive the first hydraulic motor 756, which in turn drives the first rear doffer assembly 726. The first rear doffer assembly 726 may be mechanically coupled via mechanical link 752 with the first front doffer assembly 724 such that the first hydraulic motor 756 drives both the front and rear doffer assemblies in the same row unit. Moreover, the second front doffer assembly 730 and second rear doffer assembly 732 may be mechanically coupled via mechanical link 752 to one another. The second rear doffer assembly 732 may further be mechanically coupled via mechanical link 752 to the first rear doffer assembly 726 such that the first hydraulic motor 756 drives the second front and rear doffer assemblies via mechanical couplings between row units.

The same may be true of the third and fourth picking units. The second valve or valves 750 may provide hydraulic fluid to drive the second hydraulic motor 758, which in turn drives the fourth rear doffer assembly 744. The fourth rear doffer assembly 744 may be mechanically coupled via mechanical link 752 with the fourth front doffer assembly 742 such that the second hydraulic motor 758 drives both the front and rear doffer assemblies in the same row unit. Moreover, the third front doffer assembly 736 and third rear doffer assembly 738 may be mechanically coupled via mechanical link 752 to one another. The third rear doffer assembly 738 may further be mechanically coupled via mechanical link 752 to the fourth rear doffer assembly 744 such that the second hydraulic motor 758 drives the third front and rear doffer assemblies via mechanical couplings 752 between row units.

Pressure and flow commands may be communicated between the main controller 710 and the first and second valves 748, 750. Feedback from the doffers may be provided via sensors (e.g., speed sensors, pressure sensors, flow sensors, etc.) to the main controller 710 for detecting wear or a plugged condition. The main controller 710 can therefore detect wear or the plugged condition by comparing torque, speed, pressure, flow, etc. to one or more threshold conditions. For example, if the main controller 710 detects a sudden spike in motor torque, the controller 710 may compare the torque to a torque threshold and detect a plugged condition. Once the plugged condition is detected, the controller 710 can send commands to the first and second valves to control the hydraulic motors and provide independent control of the doffer assemblies to assist with removing the plugged cotton. For example, the drum and spindle drives may be mechanically driven in a reverse direction, while the controller 710 maintains the doffer assemblies rotating in a normal, forward direction. In doing so, cotton may be unwound from the plurality of spindles to clear the plugged condition. This type of control may be implemented in any of the aforementioned embodiments described in this disclosure.

Further, a gradual increase in motor torque may be detected by the main controller and compared to a torque threshold. If the torque exceeds the threshold, the controller may interpret this gradual increase in torque as excessive doffer wear. A signal or alert may be communicated to a machine operator via a dashboard or other communication device so that appropriate maintenance and corrective action may be taken. This type of prognostic care may be implemented in any of the embodiments described herein. As such, the cotton harvester may achieve efficient doffing with increased productivity by being able to monitor doffer wear and automatically clear plugs from individual row units.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A doffer assembly for a cotton harvester having a drum, a plurality spindles rotatably coupled to the drum, and a drum and spindle drive unit, the doffer assembly comprising:
   an outer housing;

a plurality of doffers adapted to remove cotton from the plurality of spindles of the harvester;
a drive unit coupled to the outer housing for rotatably driving the plurality of doffers independently of the at least one drum and spindle;
a drive shaft rotatably driven by the drive unit, the plurality of doffers arranged in a column on the drive shaft;
an interface adapter removably coupled between the drive shaft and the plurality of doffers for transferring power from the drive shaft to the plurality of doffers;
an inverter operatively connected to the electric motor configured to control the electric motor via a current draw; and
a controller operatively connected to the inverter and configured to detect a load on the electric motor based on the current draw, wherein the controller is configured to compare the current draw to a threshold value to determine a plugged condition and, in response to the plugged condition, is configured to provide one of a change in motor speed or a direction of rotation of the doffer assembly;
wherein the drive unit includes an electric motor operatively connected to the drive shaft for rotatably driving each of the plurality of doffers.

2. The doffer assembly of claim 1, wherein the inverter and the controller comprise an inverter controller adapted to detect a condition related to doffer wear or a plug based on the current draw of the electric motor.

3. The doffer assembly of claim 1, further comprising:
a drive coupler coupled to the drive shaft; and
a driven coupler coupled to the drive coupler and the interface adapter.

4. The doffer assembly of claim 1, wherein the drive unit is axially aligned with the plurality of doffers.

5. The doffer assembly of claim 1, further comprising a doffer adjustment device for axially adjusting the plurality of doffers relative to the outer housing, the doffer adjustment device including a doffer adjustment shaft.

6. The doffer assembly of claim 1, further comprising a second doffer assembly including a second shaft and a plurality of second doffers arranged in a column on the second shaft, the plurality of second doffers configured to remove cotton from a second plurality of spindles, wherein the second doffer assembly is rotatably driven independently of the first and second plurality of spindles.

7. The doffer assembly of claim 6, further comprising:
a second electric motor operatively connected to the second shaft for rotatably driving each of the plurality of second doffers; and
wherein an inverter is configured to electrically power the first and second electric motors.

8. A doffer assembly for a cotton harvester having a drum, a plurality spindles rotatably coupled to the drum, and a drum and spindle drive unit, the doffer assembly comprising:
an outer housing;
a plurality of doffers adapted to remove cotton from the plurality of spindles of the harvester;
a doffer drive unit comprising an electric motor, the doffer drive unit coupled to the outer housing for rotatably driving the plurality of doffers independently of the at least one drum and spindle;
a drive shaft rotatably driven by the drive unit, the plurality of doffers arranged in a column on the drive shaft;
an interface adapter coupled between the drive shaft and the plurality of doffers for transferring power from the drive shaft to the plurality of doffers;
an inverter operatively connected to the electric motor configured to control the electric motor via a current draw; and
a controller operatively connected to the inverter and configured to detect a load on the electric motor based on the current draw, wherein the controller is configured to compare the current draw to a threshold value to determine a plugged condition and, in response to the plugged condition, is configured to provide one of a change in motor speed or a direction of rotation of the doffer assembly;
wherein the electric motor is operatively connected to the drive shaft for rotatably driving each of the plurality of doffers.

9. The doffer assembly of claim 8, wherein the inverter and the controller comprise an inverter controller adapted to detect a condition related to doffer wear or a plug based on the current draw of the electric motor.

10. The doffer assembly of claim 8, further comprising a doffer adjustment device for axially adjusting the plurality of doffers relative to the outer housing, the doffer adjustment device including a doffer adjustment shaft.

11. The doffer assembly of claim 8, further comprising a second doffer assembly including a second shaft and a plurality of second doffers arranged in a column on the second shaft, the plurality of second doffers configured to remove cotton from a second plurality of spindles, wherein the second doffer assembly is rotatably driven independently of the first and second plurality of spindles.

12. The doffer assembly of claim 11, further comprising:
a second electric motor operatively connected to the second shaft for rotatably driving each of the plurality of second doffers; and
wherein the inverter is configured to electrically power the first and second electric motors.

* * * * *